United States Patent
Peng et al.

(10) Patent No.: US 8,437,139 B2
(45) Date of Patent: May 7, 2013

(54) EXPANSION CARD

(75) Inventors: Wen-Tang Peng, New Taipei (TW);
Hai-Chen Zhou, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/316,466

(22) Filed: Dec. 10, 2011

(65) Prior Publication Data
US 2013/0021761 A1    Jan. 24, 2013

(30) Foreign Application Priority Data
Jul. 22, 2011    (CN) .......................... 2011 1 0206477

(51) Int. Cl.
*H05K 1/00*    (2006.01)

(52) U.S. Cl.
USPC ........... 361/748; 361/727; 361/807; 361/809; 361/810

(58) Field of Classification Search .................. 361/748, 361/727, 807, 809, 810, 629
See application file for complete search history.

(56) References Cited

U.S. PATENT DOCUMENTS

| | | | | |
|---|---|---|---|---|
| 7,499,287 B2 * | 3/2009 | Jandzio et al. | ................ | 361/760 |
| 7,499,289 B2 * | 3/2009 | Liang | ............................ | 361/796 |
| 7,990,728 B2 * | 8/2011 | Wang | ............................ | 361/747 |

* cited by examiner

*Primary Examiner* — Timothy Thompson
*Assistant Examiner* — Andargie M Aychillhum
(74) *Attorney, Agent, or Firm* — Altis Law Group, Inc.

(57) ABSTRACT

An expansion card has at least one connector electrically coupled with at least one expansion slot of a server, and includes a shell defining at least one through slot, a main body, and a transmission element received in the shell. The transmission element includes a locating element, a connecting pole, and a fixing shaft. The connecting pole includes a head portion and a tail portion. The head portion defines a notch sleeving on the locating element. The tail portion extends outwards from the shell and defines a first hole. The fixing shaft is fixed on the shell and extends through the first hole. When the tail portion is pushed, the connecting pole rotates around the fixing shaft, the head portion drives the at least one connector to extends outwards or inwards from the at least one through slot, to electrically connected or disconnected to the at least one expansion slot.

15 Claims, 9 Drawing Sheets

EXPANSION CARD

BACKGROUND

1. Technical Field

The present disclosure relates to an expansion card.

2. Description of Related Art

Expansion cards are inserted into expansion slots of servers for adding functionality to the servers. However, in some kinds of servers, the expansion slots are positioned on a sidewall parallel to the inserting direction of the expansion card and are not easy to be coupled with the expansion card. Therefore, it is very inconvenient to assemble the expansion cards to the servers or disassemble the expansion cards from the servers.

Therefore, it is desirable to provide an expansion card that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
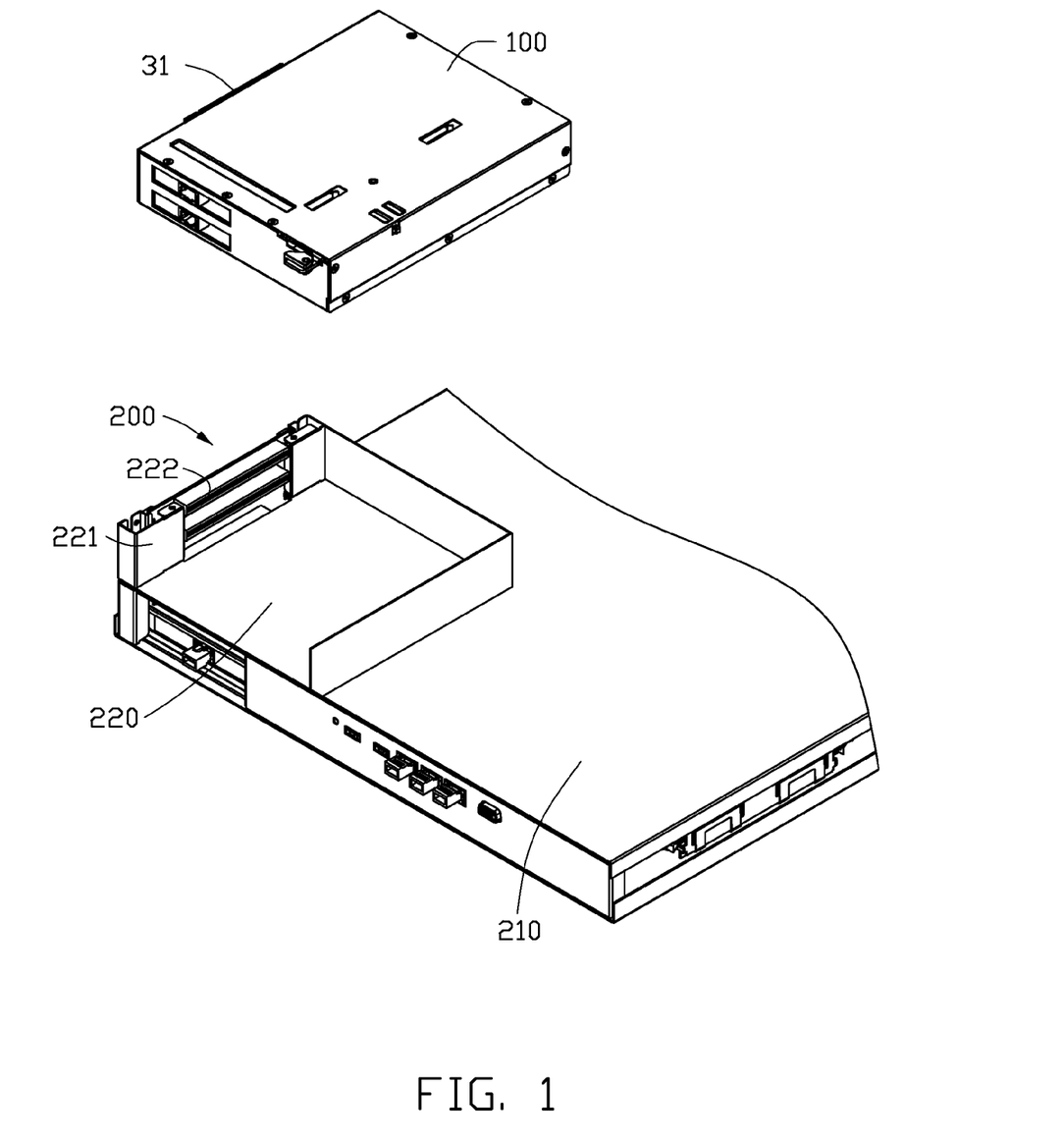
FIG. 1 is a schematic view of an expansion card and a mother-board, according to an exemplary embodiment.
Figure 2:
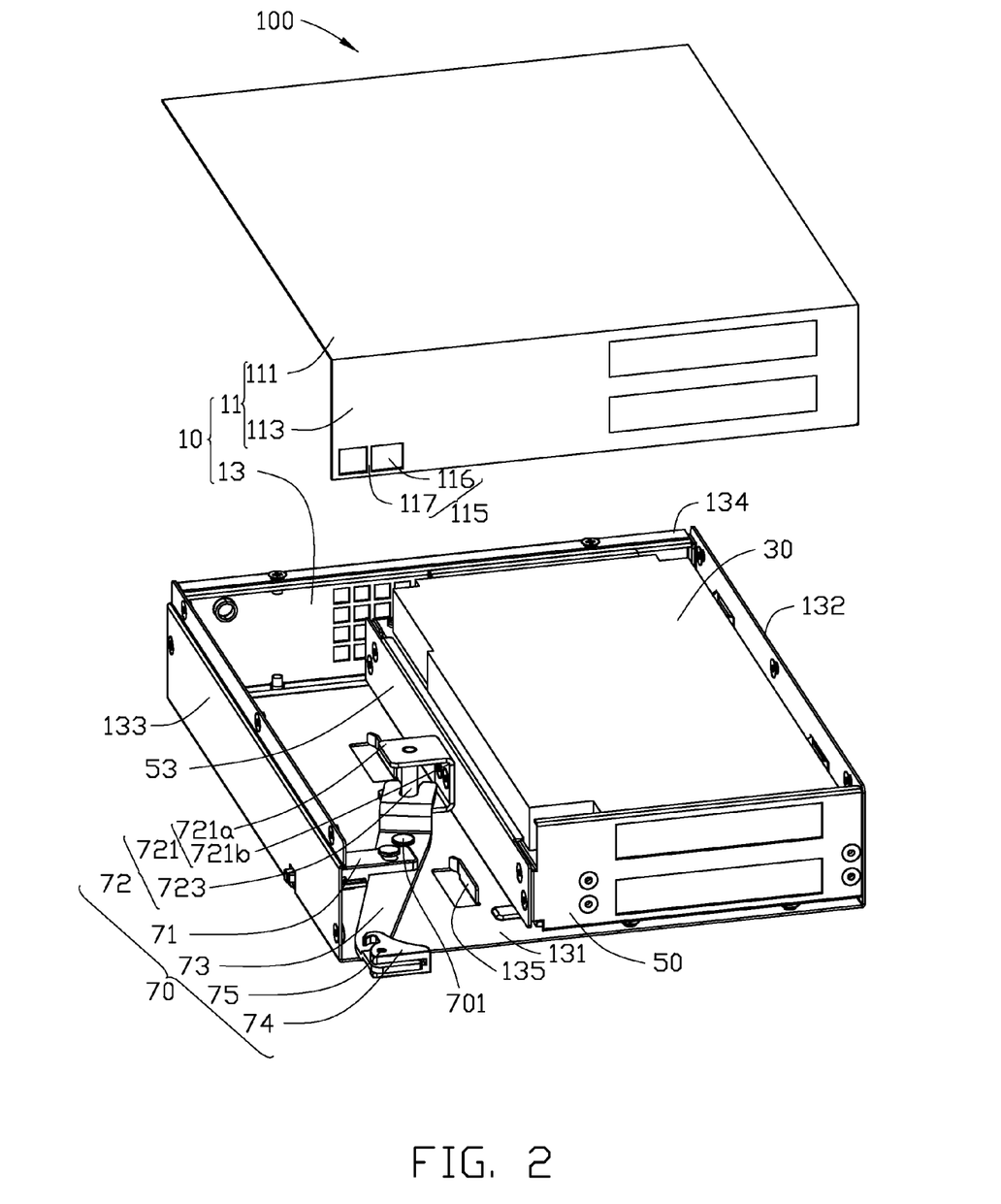
FIG. 2 is a schematic view of the expansion card of FIG. 1.

Referring to FIGS. 1&2, an expansion card 100, according to an embodiment, is inserted into two expansion slots 222 of a server 200 for adding functionality to the server 200. The server 200 includes a mother-board 210 and a housing 220 positioned on the mother-board 210. The housing 220 receives the expansion card 100, and includes an inner sidewall 221 parallel to the inserting direction of the expansion card 100. The two expansion slots 222 are positioned on the inner sidewall 221.

The expansion card 100 includes a cuboid shell 10, a main body 30, an outer frame 50, and a transmission element 70. The main body 30, the outer frame 50, and the transmission element 70 are received in the shell 10.

The shell 10 includes a top cover 11 and a bottom cover 13. The top cover 11 includes a top plate 111 and a first sidewall 113 perpendicular to the top plate 111. A locking assembly 115 is positioned on the first sidewall 113. In this embodiment, the locking assembly 115 includes a rectangular fixing groove 116 passing through the first sidewall 113 and a rod 117 connecting between two opposite edges of the fixing groove 116.

Figure 3:
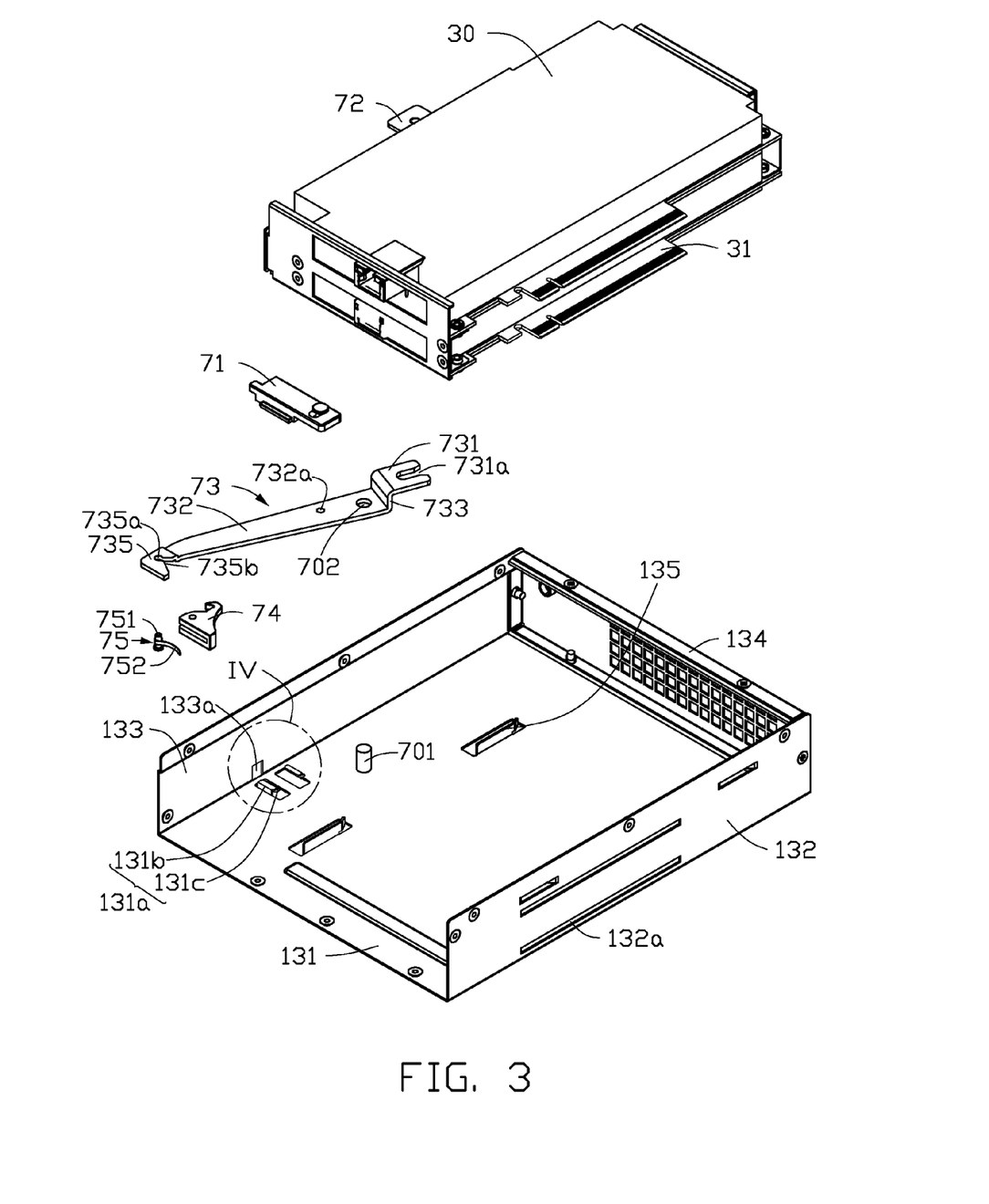
FIG. 3 is a schematic view of the expansion card of FIG. 1, taking off a top cover.
Figure 4:
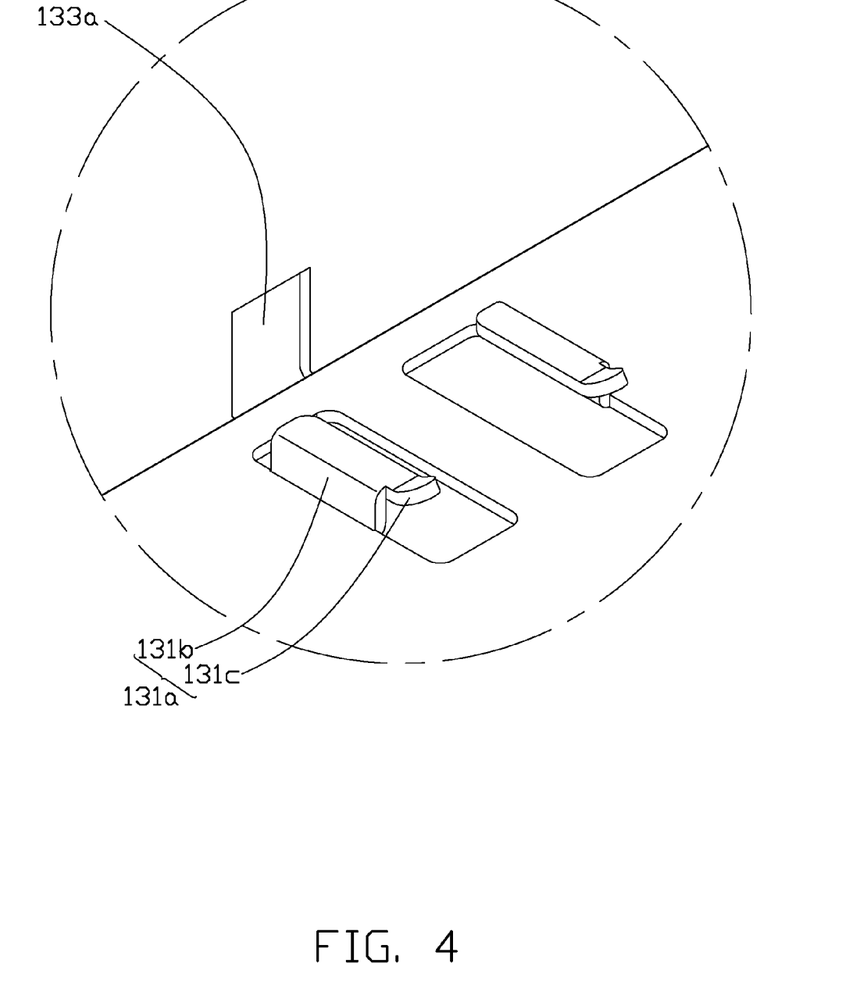
FIG. 4 is a schematic, enlarged view of a portion IV of the expansion card of FIG. 3.

Also referring to FIGS. 3&4, the bottom cover 13 includes a bottom plate 131, a second sidewall 132, a third sidewall 133 parallel to the second sidewall 132, and a fourth sidewall 134 perpendicularly connected between the second sidewall 132 and the third sidewall 133. The fourth sidewall 134 is parallel to the first sidewall 131. The second sidewall 132 faces the inner sidewall 221 of the server 200, and defines two through slots 132a passing through the second sidewall 132 and corresponding to the two expansion slots 222. The bottom plate 131 positions two parallel rails 131a adjacent to the cross of the third sidewall 133 and the first sidewall 113. The extending direction of each rail 131a is perpendicular to the lengthwise direction of the third sidewall 133. Each rail 131a is L-shaped, and includes a connecting portion 131b and a latching portion 131c. The connecting portion 131b is fixed on the bottom plate 131. The latching portion 131c is connected perpendicularly to the connecting portion 131b, and bends towards the other rail 131a.

The third sidewall 133 defines a pinhole 133a adjacent to the bottom plate 131. The orthogonal projection of the pinhole 133a on the bottom plate 131 is between the two rails 131a. The bottom plate 131 arranges two bars 135 in a straight-line along the lengthwise direction of the second sidewall 132. The two bars 135 are cooperated with the second sidewall 132 to limit the sliding range of the main body 30. The number of the bars 135 is not limited to this embodiment.

The main body 30 is received in the receiving space between the two bars 135 and the second sidewall 132. Two connectors 31 are positioned on a surface of the main body 30 facing the two through slots 132a, and can extend outwards from the two slots through 132a respectively, and thus to couple with the corresponding expansion slots 222.

Figure 5:
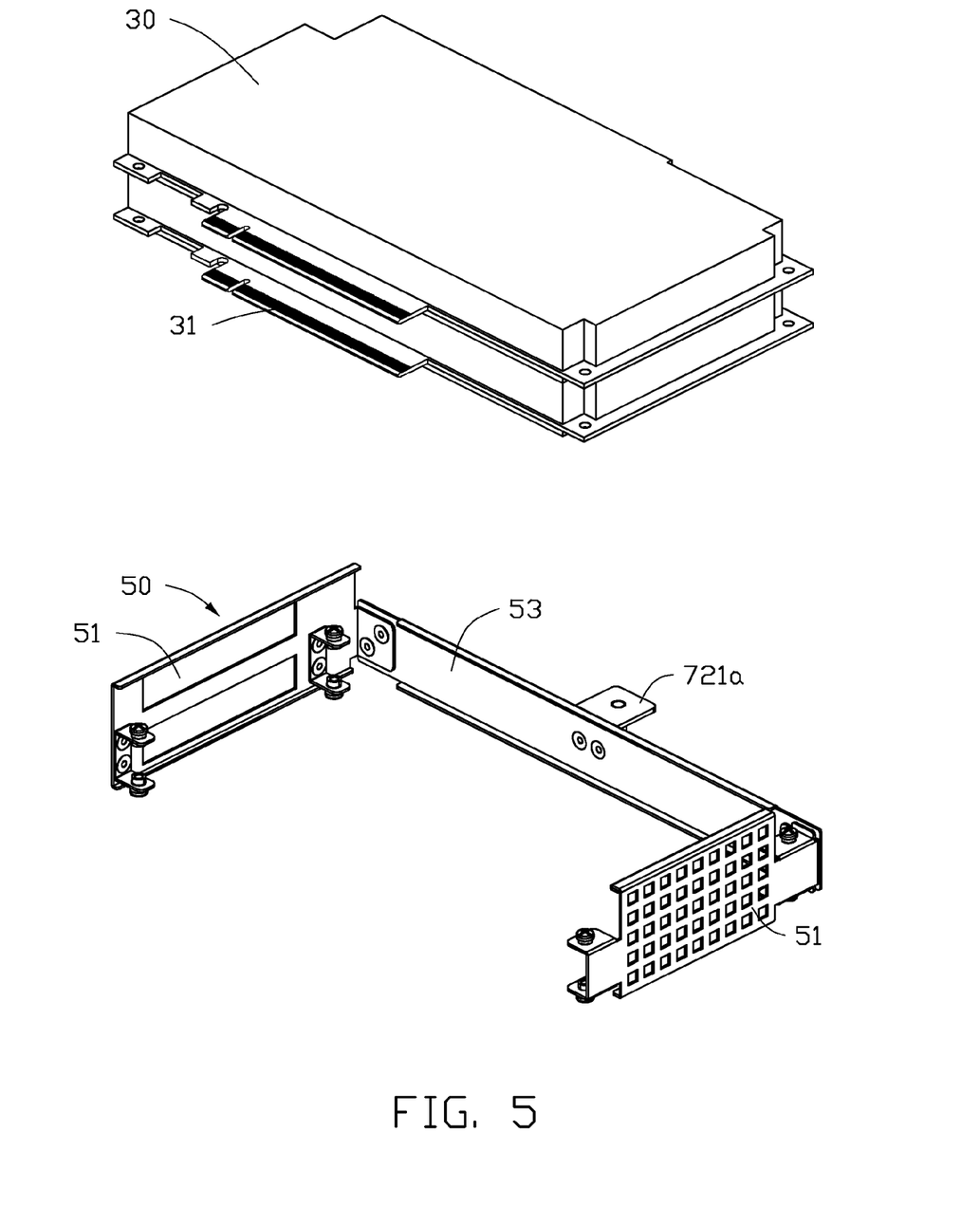
FIG. 5 is a schematic, exploded view of a main body and an outer frame of the expansion card of FIG. 3.

Also referring to FIG. 5, the outer frame 50 covers the outer sidewall of the main body 30 excluding a surface on which the two connectors 31 are positioned, and includes two parallel fixing arms 51 and a connecting arm 53 connecting between the two fixing arms 51. The two fixing arms 51 are fixed on the main body 30. The distance between a surface of the connecting arm 53 away from the main body 30 and a surface of the connector 31 away from the main body 30 is substantially equal to the distance between each bar 135 and the second sidewall 132. The two fixing arms 51 contact with the top plate 111 and the bottom plate 131, and thus the two connectors 31 can slide towards the second sidewall 132 and extend outwards from the two through slots 132a. The surfaces of the two fixing arms 51 contacting with the top plate 111 and the bottom plate 131 are smooth to reduce the friction force between the outer frame 50 and the top plate 111, and between the outer frame 50 and the bottom plate 131.

Figure 6:
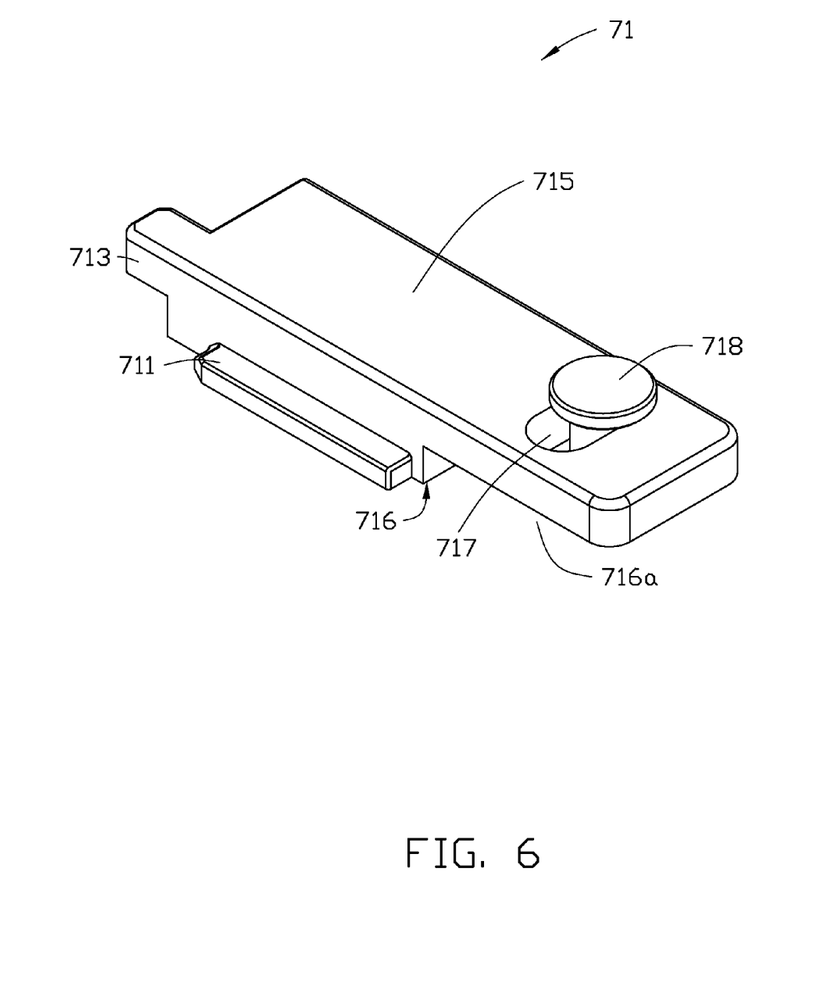
FIG. 6 is a schematic view of a sliding block of the expansion card of FIG. 3.

Referring to FIGS. 2&6, the transmission element 70 includes a cuboid sliding block 71, a locating element 72, a connecting pole 73, a fixing shaft 701, an I-shaped rotating shaft 718, a buckle 74, and a torsional spring 75. Two opposite surfaces of the sliding block 71 along the lengthwise direction arrange a protrusion 711 respectively. Each protrusion 711 is received in a receiving space formed by the connecting portion 131b and the latching portion 131c of the corresponding rail 131a, and thus the sliding block 71 can slide along the rails 131a. The sliding block 71 arranges a pin 713 corresponding to the pinhole 133a. When the sliding block 71 slides in the rails 131a, the pin 713 can extends through the pinhole 133a. The sliding block 71 further includes a top surface 715 away from the bottom plate 131 and a bottom surface 716 opposite to the top surface 715. The bottom surface 716 defines a cutout 716a away from the pin 713. One end of the sliding block 71 away from the pin 713 defines a through hole 717 passing through the top surface 715 and the bottom surface 716.

Referring to FIG. 2, the locating element 72 includes a locating frame 721 and a locating shaft 723. The locating frame 721 includes two parallel first plates 721a and a second plate 721b perpendicularly connected between the two first plates 721a. The second plate 721b is fixed on a surface of the connecting arm 53 away from the main body 30 between the two bars 135, and is adjacent to the fourth sidewall 134 with respect to the sliding block 71. The locating shaft 723 is parallel to the second plate 721b, and two opposite ends of the locating shaft 723 are respectively fixed on the two first plates 721a.

Referring to FIG. 3, the connecting pole 73 is substantially Z-shaped, and includes a head portion 731, a tail portion 732, and a neck portion 733 connected between the head portion 731 and the tail portion 732. The head portion 731 and the tail portion 732 are not coplanar. Along the extending direction of the connecting pole 73, the length of the head portion 731 is shorter than the length of the tail portion 732. The head portion 731 defines a notch 731a away from the tail portion 732. The notch 731a is U-shaped, and can sleeve on the locating shaft 723.

The head portion 731 is loaded on the first plate 721a adjacent to the bottom plate 131. The tail portion 732 extends toward the cross of the first sidewall 113 and the third sidewall 133. The tail portion 732 is partially received in the cutout 716a, and defines a first hole 702 and a second hole 732a perpendicularly passing through the tail portion 732. The second hole 732a is coaxial with the through hole 717. The first hole 702 is between the neck portion 733 and the second hole 732a. The fixing shaft 701 is fixed on the bottom plate 131, and extends through the first hole 702. The rotating shaft 718 inserts into the through hole 717 and the second hole 732a. The tail portion 732 away from the head portion 731 extends outwards from the shell 10. The connecting pole 73 further includes a handle 735 fixed on one end of the tail portion 732 away from the head portion 731. The handle 735 defines a first connecting hole 735a with an opening 735b facing the second sidewall 132. The first connecting hole 735 passes through the handle 735 perpendicular to the bottom plate 131.

The buckle 74 is hook-shaped, and is rotatably connected to the handle 735 through the torsional spring 75, the elastic force of the torsional spring 75 makes the buckle 74 to hook on the rod 117 firmly. In particular, referring to FIG. 7, the buckle 74 includes a substantially triangle-shaped fixing portion 741 and a hook portion 742. The fixing portion 741 has a first surface 741a, a second surface 741b, and a third surface 741c connected one by one. The hook portion 742 extends from an intersection of the first surface 741a and the third surface 741c along the direction parallel to the bottom plate 131 and bends towards the first surface 741a. The fixing portion 741 defines a receiving groove 743 passing through the first surface 741a and the second surface 741b and parallel to the bottom plate 131, and a second connecting hole 744 perpendicularly passing through the fixing portion 741 and communicating with the receiving groove 743. The receiving groove 743 comprised an inner surface 743a. The hook portion 742 faces the opening 735b, the handle 735 is received in the receiving groove 743, and the first connecting hole 735a is coaxial with the second connecting hole 744.

Figure 7:
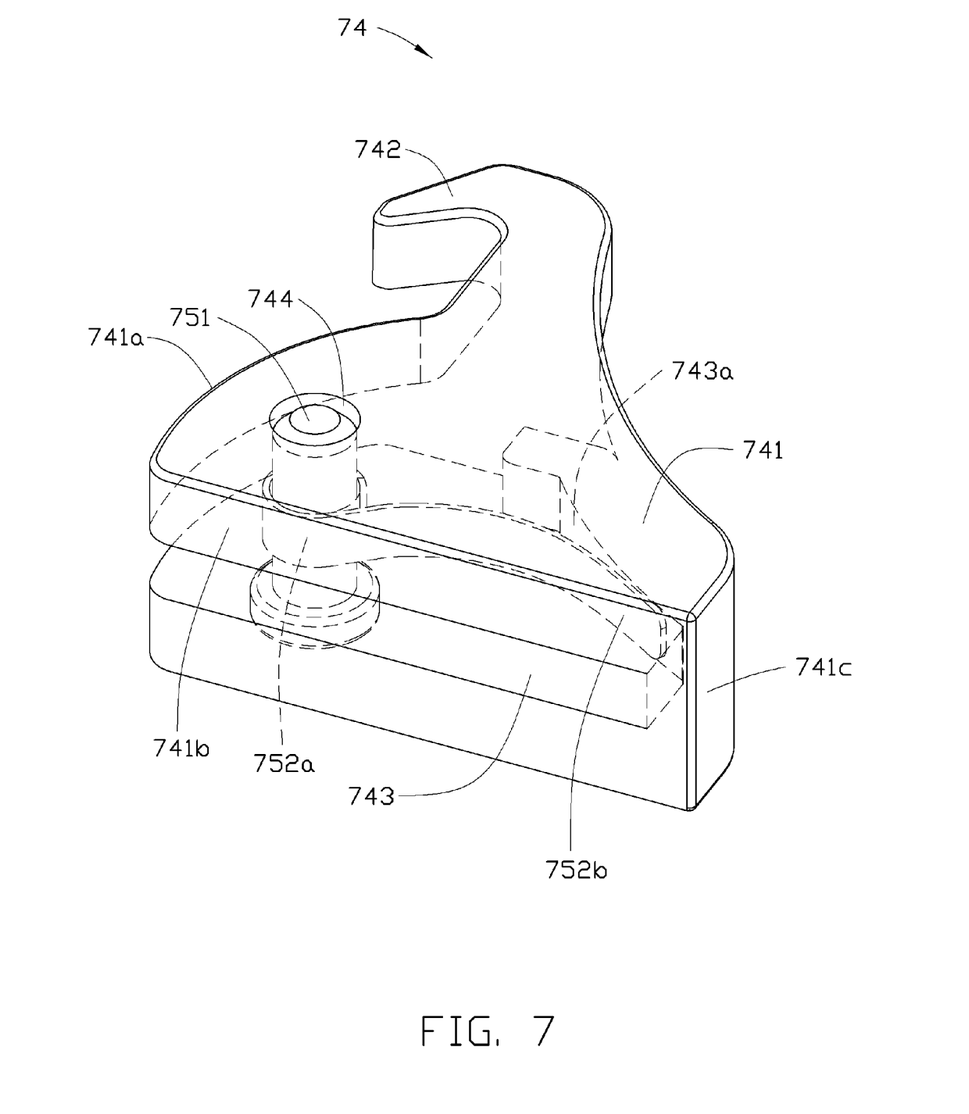
FIG. 7 is a schematic, assembled view of a torsional spring and a buckle of the expansion card of FIG. 3.

The torsional spring 75 includes a connecting shaft 751 and an elastic sheet 752. The elastic sheet 752 includes a ring 752a sleeved over the connecting shaft 751 and a resisting sheet 752b extending from the ring 752a. The ring 752a is received in the receiving groove 743. The resisting sheet 752b resists the inner surface 743a to provide an elastic force to push the buckle 74 towards the tail portion 732. The connecting shaft 751 extends through the first connecting hole 735a and the second connecting hole 744. When the buckle 74 is pulled towards the first sidewall 113, the elastic sheet 752 provides the elastic force to push the buckle 74 towards the tail portion 732.

Figure 8:
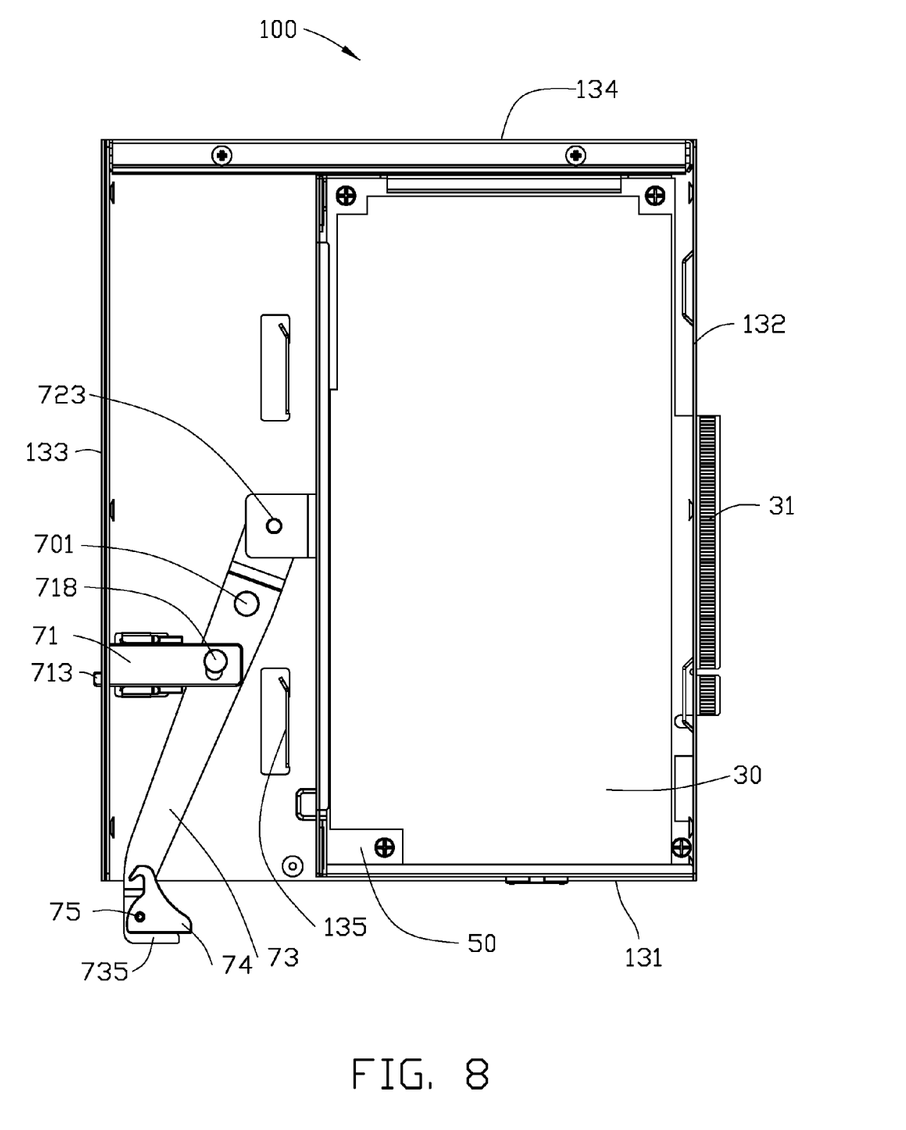
FIG. 8 is a schematic view of the expansion card of FIG. 1, in a first working state.
Figure 9:
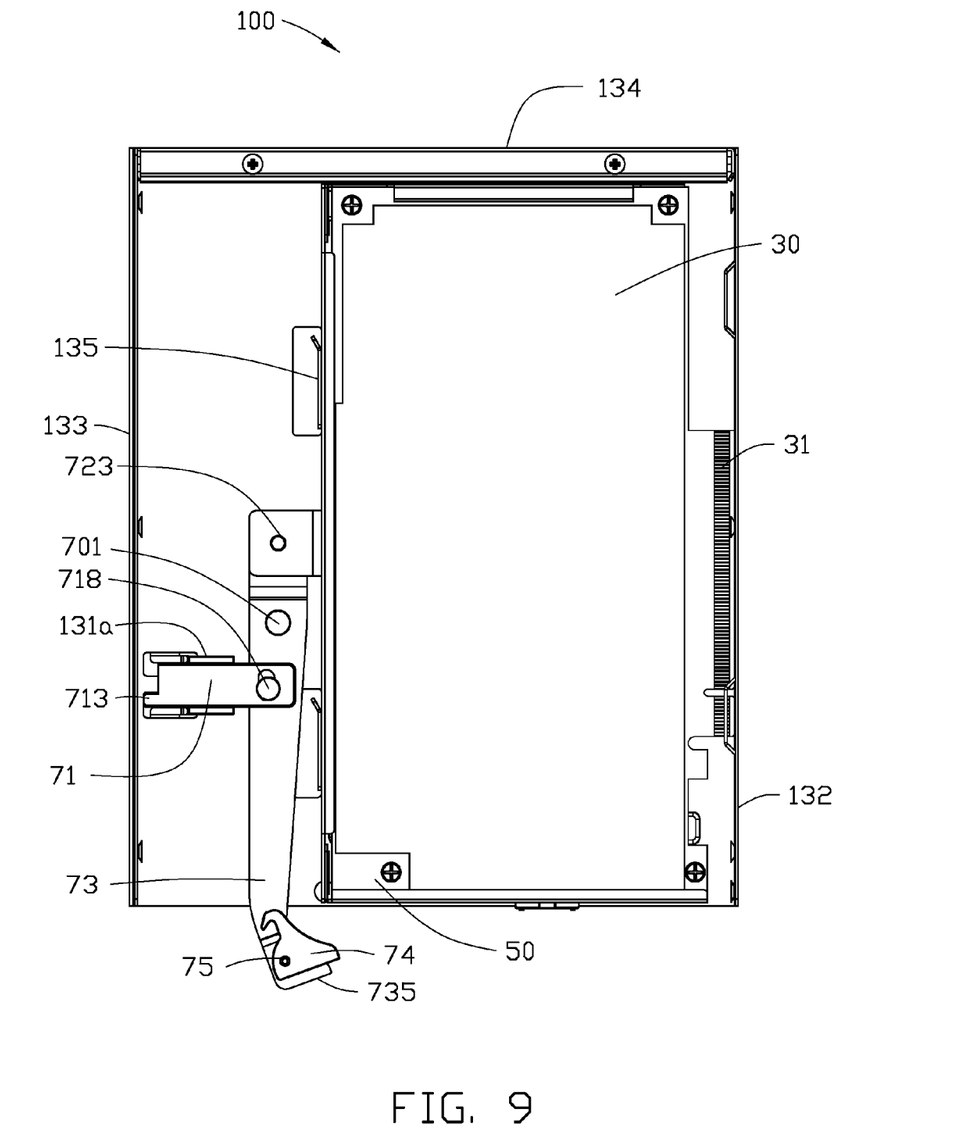
FIG. 9 is a schematic view of the expansion card of FIG. 1, in a second working state.

Also referring to FIGS. 8&9, in use, the expansion card 100 is inserted into the server 200 until one of the two fixing frames 51 contacts with the fourth sidewall 134, at this time, the two connectors 31 are aligned with the two expansion slots 222 respectively. The handle 735 is moved towards the third sidewall 133, the connecting pole 73 rotates around the fixing shaft 701. The head portion 731 pushes the main body 30 to move towards the second sidewall 132 through the locating shaft 723, and thus the two connectors 31 extend outward from the two through slots 132a respectively, and insert into the corresponding expansion slot 222. The tail portion 732 pushes the sliding block 71 to move towards the third sidewall 133 through the rotating shaft 718, and the pin 713 extends through the pinhole 133a. Then the torsional spring 75 makes the buckle 74 to firmly hook on the rod 117, and thus the main body 30 is fixedly received in the shell 10.

When the expansion card 100 needs to be pulled out, the buckle 74 is separated from the rod 117, the handle 735 is moved towards the second sidewall 132, and the connecting pole 73 rotates around the fixing shaft 701. The head portion 731 pulls the main body 30 to move towards the third sidewall 133 until the outer frame 50 contacts with the two bars 135. It means the two connectors 31 have been separated from the corresponding expansion slots 222, and comes back into the shell 10. The tail portion 732 pulls the sliding block 71 to move towards the second sidewall 132, and the pin 713 moves away from the pinhole 133a and comes back into the shell 10. Then the expansion card 100 can be pulled out from the server 200.

In other embodiment, the sliding block 71, the rotating shaft 718, and the rail 131a can be omitted.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An expansion card for electrically connecting to at least one expansion slot of a server, the expansion card comprising:
   a shell defining at least one through slot;
   a main body movably received in the shell, and having at least one connector, each connector spatially corresponding to a respective one of the at least one through slot and configured for passing through the respective through slot and coupling with a respective one of the at least one expansion slot; and
   a transmission element received in the shell and comprising:
   a locating element fixed on the main body, and comprising a locating shaft;
   a connecting pole comprising a head portion and a tail portion, the head portion defining a notch sleeving on the locating shaft, the tail portion extending out of the shell, the tail portion defining a first hole, and a fixing shaft fixing on the shell and extending through the first hole;

wherein when the tail portion is rotated around the fixing shaft in a first direction away from the main body, the head portion drives the main body via the locating element in such a way that the at least on connector passes through the at least one through slot to insert the at least one expansion slot, and thus the at least one connector is electrically connected to the at least one expansion slot; when the tail portion is rotated around the fixing shaft in a second direction towards the main body, the head portion drives the main body via the locating element in such a way that the at least on connector moves out of the at least one expansion slot, and thus the at least one connector is electrically disconnected to the at least one expansion slot.

2. The expansion card of claim 1, wherein the shell comprises a top cover and a bottom cover, the top cover comprises a top plate and a first sidewall, the bottom cover comprises a bottom plate opposite to the top plate, a second sidewall, a third sidewall opposite to the second sidewall, and a fourth sidewall connected between the second sidewall and the third sidewall and parallel with the first sidewall, the at least one through slot is defined in the second sidewall, the fixing shaft is fixed on the bottom plate.

3. The expansion card of claim 2, wherein the bottom plate arranges two parallel rails adjacent to the third sidewall and far away from the fourth sidewall, the extending direction of each rail is perpendicular to the third sidewall, the third sidewall defines a pinhole adjacent to the rails, the transmission element further comprises a sliding block, the sliding block is rotatably connected to the tail portion and slidably mounted on the rails, the sliding block comprises a pin spatially corresponding to the pinhole, when the tail portion is rotated around the fixing shaft in the first direction, the sliding block slides along the rails and the pin extends through the pinhole.

4. The expansion card of claim 3, wherein the sliding block defines a through hole away from the pin, the tail portion defines a second hole coaxial with the through hole, the transmitting element further comprises a rotating shaft inserted into the through hole and the second hole.

5. The expansion card of claim 4, wherein a surface of the sliding block facing the bottom plate defines a cutout away from the pin, the tail portion is partially received in the cutout.

6. The expansion card of claim 3, wherein each rail comprises a connecting portion and a latching portion, the connecting portion is fixed on the bottom plate, the latching portion is perpendicularly connected to the connecting portion and bends towards the other rail, two opposite surfaces of the sliding block arranges a protrusion respectively, each protrusion is received in a receiving space defined by the connecting portion and the latching portion of a corresponding rail.

7. The expansion card of claim 2, wherein the expansion card further comprises an outer frame surrounding the main body excluding a surface of the main body on which the at least one connectors are positioned, the outer frame comprises two parallel fixing arms and a connecting arm connecting between the two fixing arms, the two fixing arms contact with the top plate and the bottom plate, the locating element is connected to the main body through the connecting arm.

8. The expansion card of claim 7, wherein two surfaces of each of the two fixing arms contacting with the top plate and the bottom plate are smooth.

9. The expansion card of claim 2, wherein the bottom plate further arranges at least one bar, the main body is capable of sliding in a receiving space between the at least one bar and the second sidewall, when the main body touches the at least one bar, the at least one connector is disconnected to the at least one expansion slot.

10. The expansion card of claim 2, wherein the locating element further comprises a locating frame, the locating frame comprises two parallel first plates and a second plate perpendicularly connected between the two first plates, the second plate is fixed on the main body, two opposite ends of the locating shaft are fixed on the two first plates respectively, one of the two first plate adjacent to the bottom plate is capable of loading the head portion of the connecting pole.

11. The expansion card of claim 2, wherein the transmission element further comprises a handle connected to the tail portion.

12. The expansion card of claim 11, wherein the transmission element further comprises a buckle rotatably connected to the handle, the shell further has a locking assembly coupled with the buckle.

13. The expansion card of claim 12, wherein the locking element comprises a fixing groove defining in the first sidewall and a rod connected between two opposite edges of the fixing groove, the buckle is capable of hooking on the rod.

14. The expansion card of claim 12, wherein the handle defines a first connecting hole with an opening facing the second sidewall, the buckle comprises a substantially triangle-shaped fixing portion and a hook portion, the fixing portion has a first surface, a second surface, and a third surface connected one by one, the hook portion extends from an intersection of the first surface and the third portion along the direction parallel to the bottom plate, and bends towards the first surface, the fixing portion defines a receiving groove passing through the first surface and the second surface along the direction parallel to the bottom plate, and a second connecting hole perpendicularly passing through the fixing portion and communicating with the receiving groove, the receiving groove comprised an inner surface, the hook portion faces the opening, the handle is received in the receiving groove, and the first connecting hole is coaxial with the second connecting hole; the transmission element further comprises a torsional spring comprising a connecting shaft and an elastic sheet, the elastic sheet comprises a ring sleeved over the connecting shaft and a resisting sheet extending from the ring, the ring is received in the receiving groove, the resisting sheet resists the inner surface to provide an elastic force to push the buckle towards the tail portion, the connecting shaft extends through the first connecting hole and the second connecting hole, when the buckle is pulled towards the first sidewall, the elastic sheet provides the elastic force to push the buckle towards the tail portion.

15. The expansion card of claim 1, wherein the connecting pole further comprises a neck portion connected between the head portion and the tail portion.

* * * * *